F. W. P. RAJALA.
CROSSCUT SAW SET.
APPLICATION FILED AUG. 10, 1909.
955,901.
Patented Apr. 26, 1910.
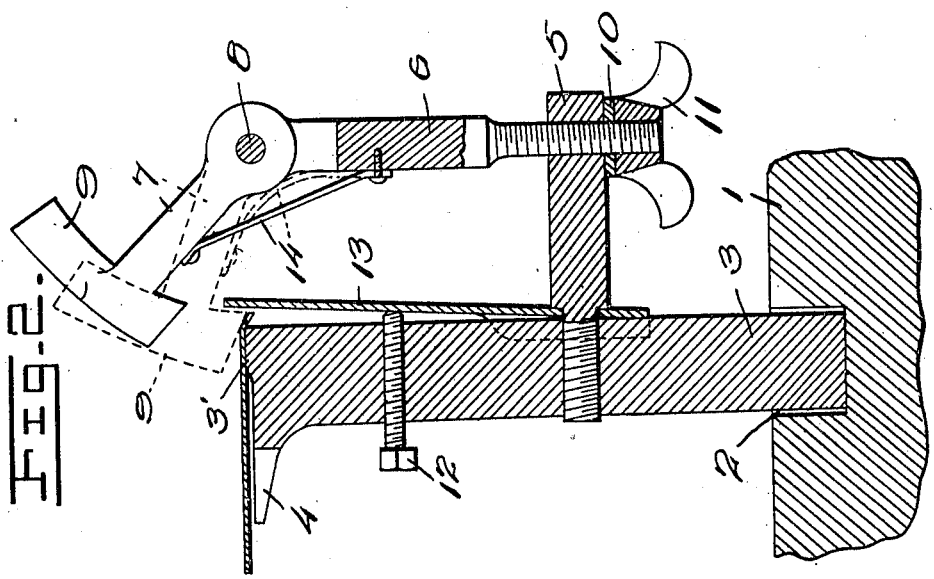
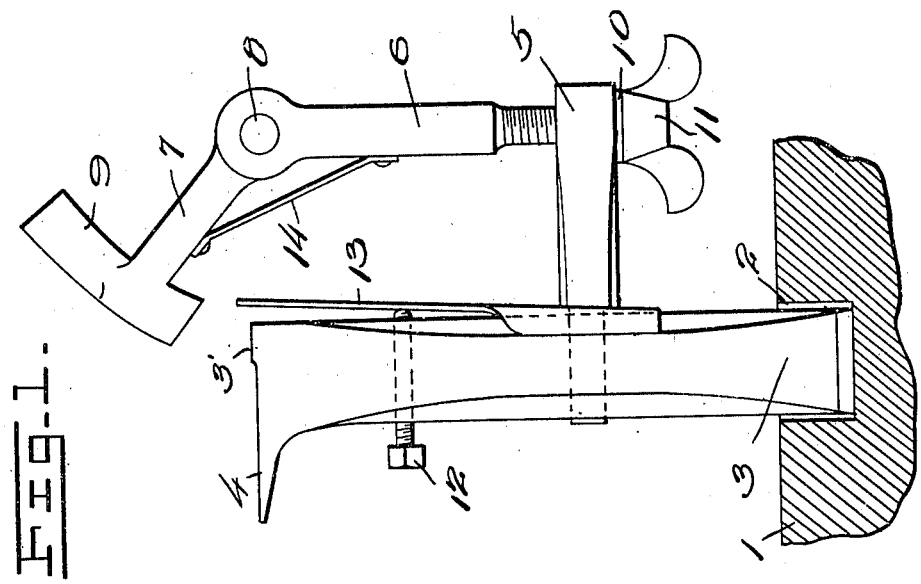
Witnesses
Morris Lessin
L. L. Armstrong
Inventor
F. W. P. Rajala
Woodward & Chandlee
Attorneys

UNITED STATES PATENT OFFICE.

FRANK W. P. RAJALA, OF CATALDO, IDAHO.

CROSSCUT-SAW SET.

955,901.  Specification of Letters Patent.  Patented Apr. 26, 1910.

Application filed August 10, 1909.  Serial No. 512,132.

*To all whom it may concern:*

Be it known that I, FRANK W. P. RAJALA, a citizen of the United States, residing at Cataldo, in the county of Kootenai and State of Idaho, have invented certain new and useful Improvements in Crosscut-Saw Sets, of which the following is a specification.

This invention relates to a new and useful improvement in saw sets and more particularly to a device of this character, which is designed with especial reference to the setting of the teeth of cross cut saws.

The main object of my invention is to provide a saw set, adapted to be seated and supported in the socket of an ordinary blacksmith's anvil, and so constructed that the teeth of cross cut saws may be quickly and accurately set.

Another object is to provide a saw set in which the various parts thereof are adjustable, whereby the teeth of the saw may be set at any desired inclination.

Another object is to provide a suitable saw supporting base member, which is formed on one side with a suitable claw which may be adapted to a variety of purposes.

With these and other objects in view, the present invention consists in the combination and arrangement of parts as will be hereinafter more fully described and particularly pointed out in the appended claims, it being understood that changes in the specified structure shown and described may be made within the scope of the claims without departing from the spirit of the invention.

In the drawings forming a portion of this specification, and in which like numerals of reference indicate similar parts in the several views, Figure 1 is a side elevation of my improved saw set, showing the same in position in the socket of an anvil. Fig. 2 is a central, vertical section therethrough.

Referring to the drawings, 1 indicates an anvil of any ordinary or approved construction, in one end of which a socket 2 is provided. This socket is adapted to receive the lower end of the base member 3 of my improved saw set. The upper end of the base is provided with a slightly raised portion 3' upon the upper surface thereof and has integrally formed upon one side thereof the claw 4 which provides a wide supporting surface for the saw. The claw may also be used for a variety of purposes, when the tool is not being used in the setting of saw teeth. Suitably secured in the base member 3 is a laterally extending arm or bar 5, in the outer end of which is threaded the vertical post or standard 6. In the upper end of the standard 6 one end of the setting member 7 is pivoted as shown at 8, the other end thereof being provided with a head 9 which is adapted to contact with the teeth of the saw as will be later described.

Upon the lower threaded end of the standard 6 a washer 10 is disposed and is adapted to contact with the under side of the bar 5 and the wing nut 11 is threaded upon the end thereof, thus securely holding the standard 6 in the position to which it is adjusted. Disposed above the bar 5 and threaded through the base member 3 is a set screw 12, which is adapted to contact with a suitable leaf spring 13, one end of which is disposed beneath the bar and is secured upon the base member 3 thereby. Thus it will be seen that upon adjusting the set screw the spring may be disposed at various distances from the side of the base member 3. The upper extremity of the spring 13 extends slightly above the upper surface of the base member and is adapted to limit the movement of the saw which is placed thereon in proper position for the setting of the teeth. A leaf spring 14 has one of its ends secured to the standard 6, the other end thereof bearing on the setting member and is adapted to normally maintain the same in elevated position above the upper end of the base member 3.

In operation the saw is first placed upon the flat upper surface of the base member 3, the teeth being disposed upon the raised portion 3' thereof until the points of the same contact with the leaf spring which has previously been adjusted to the proper position so that the teeth of the saw will be disposed at the desired angle. The end 9 of the setting member 7 is now struck with a hammer, the force of the blow compelling the same to descend upon the tooth of the saw. It will be noted from reference to Fig. 2 that the lower end of the head 9 in this position is below the upper end of the leaf spring 13, and is at a slight angle to the enlargement 3' of the base 3, as the side of the base member and the inner edge of the head 9 are out of vertical alinement.

Thus the tooth of the saw will be bent downward between the side of the base member 3 and the spring blade 13.

From the foregoing it will be noted that I have provided a saw set which is extremely simple in construction as it comprises but three distinct elements which may be readily assembled into operative position by a mechanic of ordinary ability. It also sets the teeth of a saw at the proper inclination so that the best results may be obtained by the use of the same. The position of the setting member may be adjusted with relation to the base so that the head thereof may contact with the tooth of the saw at any desired point, whereby saws having teeth of different sizes may be as quickly set as those wherein the teeth are of one uniform size.

My improved saw set is extremely inexpensive to manufacture and being of a portable nature will be found extremely useful for a variety of purposes.

What is claimed is:

1. A saw set comprising a base member, a horizontal arm secured in said base member, a standard adjustably mounted in the outer end of said arm, a setting member pivoted in the upper end of said standard, a head formed upon the outer end of said setting member, a leaf spring secured to said standard and adapted to bear against the shank of said setting member to normally retain the same in a raised position, and an adjustable spring plate secured at one end to the side of said base member, the free end of said spring plate extending above the upper end of said base member and disposed in the rear of the setting head when the same is in contact therewith.

2. A saw set comprising a base member, extensions formed integral therewith at the upper end of the same, a portion of the top surface of the said base member being raised, an arm secured in said base member, a standard mounted in the outer end of said arm having a threaded lower end, a wing nut upon the lower end of said standard adapted to bear upon the under side of said arm to retain the standard in its adjusted position, a setting member pivoted in the upper end of said standard, an enlarged head formed upon the outer end of said setting member, means for normally retaining said member in a raised position above the upper surface of said base member, a spring plate having one end secured to said base member and the other end thereof extending above the same and a set screw extending through said base member and adapted to adjust said spring plate from the side thereof.

In testimony whereof I affix my signature, in presence of two witnesses.

FRANK W. P. RAJALA.

Witnesses:
DANA H. MORRISON,
WILLIAM TURTON.